(No Model.)
C. F. ALLEN.
Transfer Truck for Cars.
No. 229,072. Patented June 22, 1880.
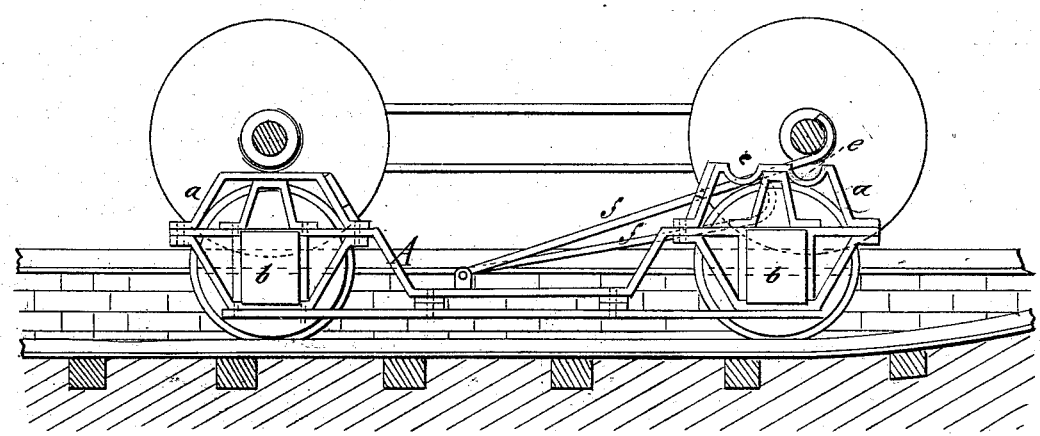
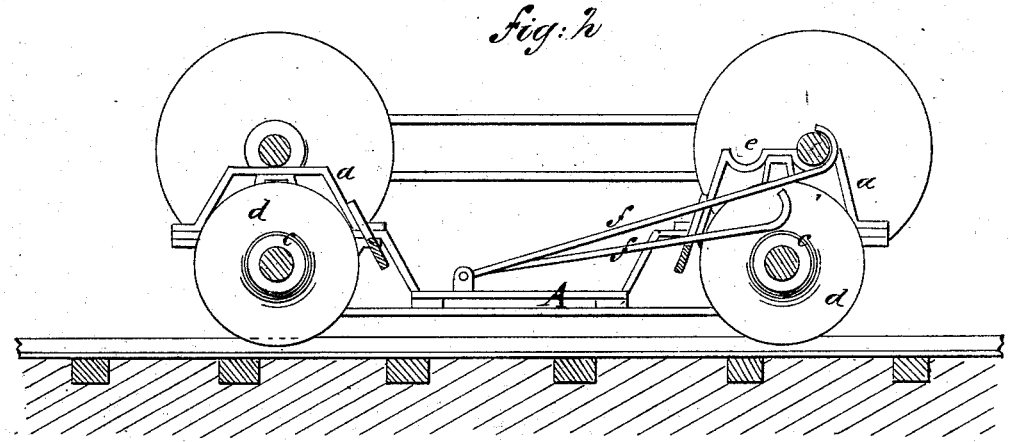
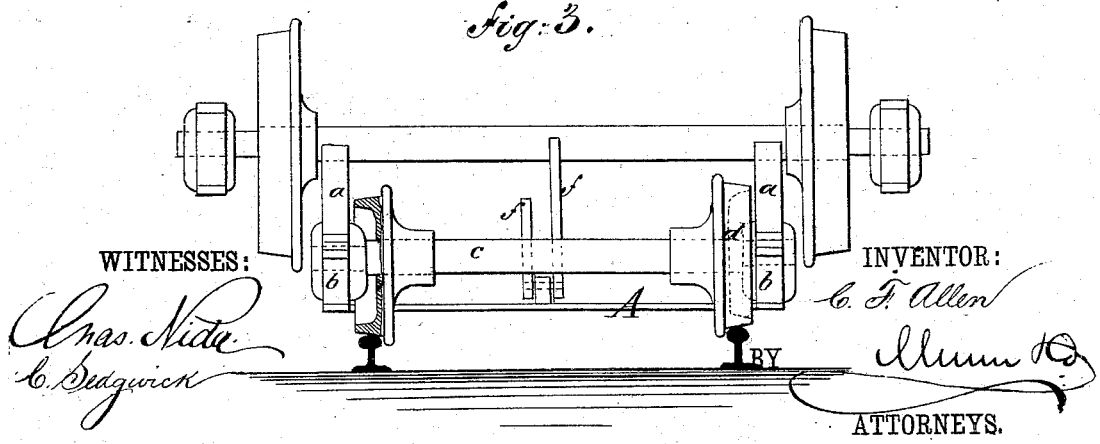
WITNESSES:
Chas. Nida
C. Sedgwick
INVENTOR:
C. F. Allen
BY
Munn &Co
ATTORNEYS.
N. PETERS, PHOTO-LITHOGRAPHER, WASHINGTON, D. C.

UNITED STATES PATENT OFFICE.

CHESTER F. ALLEN, OF PAW PAW, MICHIGAN, ASSIGNOR OF ONE-HALF OF HIS RIGHT TO EMORY O. BRIGGS, OF SAME PLACE.

TRANSFER-TRUCK FOR CARS.

SPECIFICATION forming part of Letters Patent No. 229,072, dated June 22, 1880.

Application filed March 30, 1880. (No model.)

*To all whom it may concern:*

Be it known that I, CHESTER F. ALLEN, of Paw Paw, in the county of Van Buren and State of Michigan, have invented a new and useful Improvement in Transfer-Trucks for Railway-Cars, of which the following is a specification.

The object of my invention is to furnish trucks for use in transferring broad-gage cars over narrow-gage tracks without changing the truck of the broad-gage car; and my invention consists in a narrow-gage truck constructed to carry a broad-gage truck, and provided with hooks for retaining the two trucks in position.

The narrow trucks are to be run into suitable pits in the broad track, the car run over them, and the trucks connected and run out upon the narrow track.

In the accompanying drawings, forming part of this specification, Figure 1 is a sectional side elevation, showing the narrow truck in position for receiving its load. Fig. 2 is a similar view with the truck as loaded. Fig. 3 is an end view of the same.

Similar letters of reference indicate corresponding parts.

A is the transfer-truck, which consists of a suitable skeleton-frame of iron, formed with pillars $a$, that receive oil-boxes $b$, and are fitted with axles $c$, that carry the supporting-wheels $d$.

The pillars $a$, at the outer end of the truck, are formed with semicircular recesses $e$ upon their upper surface for receiving one axle of the broad-gage truck, while the pillars $a$ at the other end are formed with a flat upper surface upon which the other axle of the broad truck will rest.

There are two recesses, $e$, in each pillar at the outer end of the truck, either one of which will be used, according to the length of the truck that is to be carried.

Upon the center cross-braces of truck A there are hung arms $f$, having hooked outer ends for taking over the axles of the broad trucks, so as to retain the two trucks together while being drawn out of the pit.

The truck A is constructed to run upon a narrow-gage track, and the frame is of such width that it passes or is between the wheels of the broad-gage truck, as seen in Fig. 3.

To permit narrowing of the truck A, so that it may pass between the wheels of the broad truck and at the same time give space for the oil-boxes $b$, the wheels $d$ of the narrow truck are recessed upon their outer surface, as shown most clearly in Fig. 3, into which recesses the boxes $b$ project. By this recessing there is sufficient space obtained for the pillars and boxes between the wheels $d$ and the wheels of the wide truck.

For loading the trucks A, a pit, as shown in Fig. 1, is constructed between the broad tracks, into which the narrow tracks run on an incline from either or both ends. The pit is of such depth at its lowest portion that when the truck A is within the pit the axles of the broad truck may be run over the pillars $a$ to the proper position. The hook $f$ is then to be caught around the axle of the upper truck, either hook being used as required, and the broad-gage car and truck being then drawn forward, the truck A will be drawn up the incline and receive the load as it rises to the level track.

It will be understood that two trucks, A, will be used for carrying a car, so that the car and its two trucks will be carried entirely by the transfer-trucks.

By these means a broad-gage car can be transferred over a narrow track, as required, and placed again upon the broad track when necessary.

Having thus described my invention, I claim as new and desire to secure by Letters Patent—

The truck A, formed with pillars $a$, having recesses $e$ $e$, and provided with the swinging hooked arms $f$ and recessed wheels $d$, substantially as shown and described, and for the purposes set forth.

CHESTER F. ALLEN.

Witnesses:
EMORY O. BRIGGS,
KIRKE W. NOYES.